(12) United States Patent  (10) Patent No.: US 8,019,329 B2
Mohanty  (45) Date of Patent: *Sep. 13, 2011

(54) WIRELESS CONTROLLER DEVICE (75) Inventor: Subhashis Mohanty, San Diego, CA (US)

(73) Assignee: TOR Anumana, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,838

(22) Filed: Dec. 11, 2010

(65) Prior Publication Data

US 2011/0072509 A1  Mar. 24, 2011

Related U.S. Application Data

(63) Continuation-in-part of application No. 12/618,723, filed on Nov. 14, 2009, which is a continuation of application No. 11/344,979, filed on Feb. 1, 2006, now Pat. No. 7,650,389, which is a continuation-in-part of application No. 11/344,979, filed on Feb. 1, 2006, now Pat. No. 7,650,389, which is a continuation-in-part of application No. 11/296,077, filed on Dec. 7, 2005, now Pat. No. 7,796,982.

(51) Int. Cl.
*H04M 3/00* (2006.01)
(52) U.S. Cl. ......... 455/420; 709/209; 709/219; 713/156
(58) Field of Classification Search ........................ None
See application file for complete search history.

(56) References Cited

U.S. PATENT DOCUMENTS

| 6,216,158 | B1 | 4/2001 | Luo et al. |
|---|---|---|---|
| 2001/0041563 | A1 | 11/2001 | Nishida |
| 2004/0097217 | A1 | 5/2004 | McClain |
| 2004/0209597 | A1 | 10/2004 | Myles et al. |
| 2004/0259537 | A1 | 12/2004 | Ackley |
| 2006/0141987 | A1 | 6/2006 | De Groot |
| 2006/0253874 | A1 | 11/2006 | Stark et al. |
| 2007/0124406 | A1 | 5/2007 | Liu et al. |
| 2007/0281679 | A1 | 12/2007 | Rodriguez et al. |
| 2008/0098295 | A1 | 4/2008 | Nelson et al. |

FOREIGN PATENT DOCUMENTS

| KR | 10-0533570 | 12/2005 |
|---|---|---|
| WO | 2004030394 | 4/2004 |

*Primary Examiner* — Charles Appiah
*Assistant Examiner* — German Viana Di Prisco
(74) *Attorney, Agent, or Firm* — Manuel de la Cerra (57) ABSTRACT

A remote wireless device is provided that operates a user interface specific to a particular target application or device. The wireless device receives information regarding the status or operation of the target's application, and uses that information to determine what information and controls to present to the remote user. The remote user views information regarding the target application, and makes desired control selections using the available controls. The wireless device generates a message according to the control selections, and transmits the message to the target device. The target device acts responsive to the control message, and updated operational information may be sent to the remote wireless device.

11 Claims, 8 Drawing Sheets

WIRELESS CONTROLLER DEVICE

BACKGROUND

The field of the present invention is applications for operation on a wireless remote device. More particularly, the present invention relates to a wireless remote device configured to operate as a wireless remote controller.

Wireless devices are widely used today, and their use is becoming more widespread as additional applications and devices become available. Also, the network infrastructures have improved wireless coverage, as well as communication quality and speeds. For example, a wireless mobile handset has improved to the point where the mobile handset may have a wide range of entertainment applications, as well as its essential communication capabilities. With these extended capabilities, the wireless handset has become the most widely deployed and most conveniently available remote wireless device. Many users consider their wireless handset to be an essential partner, both in business and in entertainment. As such, these users almost always have access to their wireless handsets, and are comfortable carrying and using the wireless handset in almost any environment. The wireless handset may take the form of a traditional wireless phone, or may be included with a personal data assistant, gaming device, or music player, for example.

The widespread use of mobile handsets permits users to work remotely while still maintaining communication with a home office, co-workers, or clients. However, when working remotely, it may be difficult to interact with necessary devices, such as a desktop computer. For example, a user's main desktop computer may have a robust set of office applications which are far too complicated to operate on a wireless handset, and for operational or security purposes, can not be operated on remote computer systems. If the user needs to access the desktop computer, or operate an application on the desktop computer, the user must obtain the assistance of someone physically in the office, or try to find a remote computer system that is allowed to remotely access the office's network. This limitation for remote users is frustrating and reduces user productivity.

In another example, a work team may need to make a presentation to an important client. Some of the work team are local to the client, so are able to attend in person, but some of the team are remote, and it would be too costly or time consuming to have them attend the meeting in person. Therefore, the remote team members use a teleconferencing system to make their respective part of the presentation. Typically, such presentations include the use of a graphical presentation program which displays charts, graphical information, or bullet slides to the client as a presenter speaks. Since some of team members are remote, a local team member operates the projection system while the remote member speaks. Often, the speaker gets out of sync with the presentation, which may confuse or perturb the client audience, or the remote speaker forgets the order or content of the slides. Either way, the client has a poor impression.

What is needed, then, is a device and system that enables a remote user to effectively and efficiently control target devices.

SUMMARY

Briefly, the present invention provides a remote wireless device that operates a user interface specific to a particular target application or device. The wireless device receives information regarding the status or operation of the target's application, and uses that information to determine what information and controls to present to the remote user. The remote user views information regarding the target application, and makes desired control selections using the available controls. The wireless device generates a message according to the control selections, and transmits the message to the target device. The target device acts responsive to the control message, and updated operational information may be sent to the remote wireless device.

In a specific example, a target is operating a graphical presentation program that includes a set of slides. The target is operating a host process that extracts status information regarding the presentation, and sends that status information to a remote wireless handset. The status information may include, for example, a thumbnail image of the current slide, a thumbnail image of the next slide, speaker notes, or a list of upcoming bullet points. The wireless device displays all or a subset of the status information to the remote users, and also presents a user control interface. The user control interface may include controls to advance to next slide, return to last slide, display next bullet, skip next bullet, for example. As the user makes control selections, the wireless handset generates and transmits control messages to the presentation program, which then operates according to the command. The target host then collects an updated status, and sends the updated status information to the remote wireless handset.

Advantageously, the wireless controller may be implemented using a wireless phone operating on a standard commercial wireless network. Since handsets are so widely deployed and used, the advantages of the present invention are available to a wide range of users and applications. The wireless controller intelligently interacts with a target device, enabling the user of a handset to make effective and efficient control decisions from a location remote from the target device.

BRIEF DESCRIPTION OF THE DRAWINGS

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views. It will also be understood that certain components and details may not appear in the figures to assist in more clearly describing the invention.

DETAILED DESCRIPTION

Figure 1:
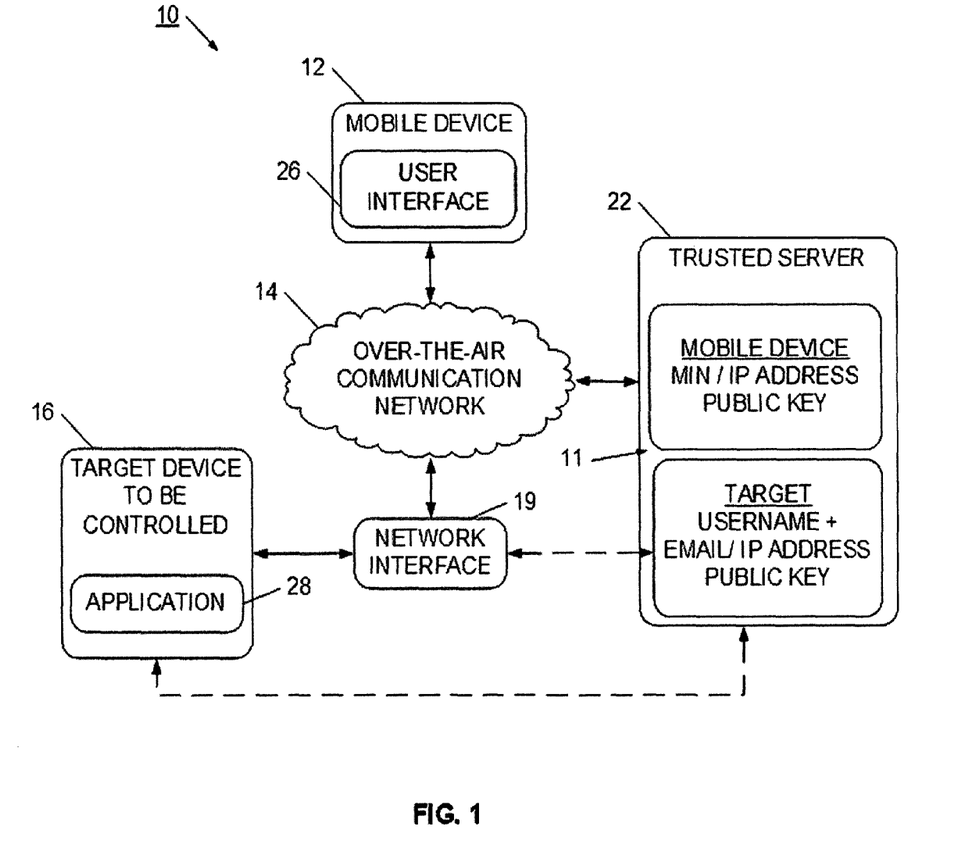
FIG. 1 is a block diagram of a wireless control system in accordance with the present invention.

Referring now to FIG. 1, an intelligent wireless control system is illustrated. Control system 10 enables a standard wireless device to intelligently adapt to a target device's condition, and thereby effectively and efficiently control that remote target device. Wireless control system 10 has a mobile device 12 communicating through a network 14 to a target 16. In one example, mobile device 12 is a wireless mobile handset communicating on a public communication network. For example, mobile device 12 may be operating according to a CDMA, CDMA 2000, UMTS, GSM, OFDMA, PHS, PCS, or other wireless communication standard. In a similar manner, communication network 14 cooperates with mobile device 12 for establishing two-way communication with target 16. It will be appreciated that any over the air communication network and corresponding wireless device may be used. Control system 10 has a target 16 that has an operating application 28 for providing a local function. For example, target device 16 may be a computer for locally displaying graphical information, or may play unicast, broadcast, or multicast audio or video content. In another example, the target may be an IPTV device, which is configure to play audio, video, or movie files received on a TCP/IP connection. In this way, application 28 may be an e-mail application, a media player application, an IPTV application, a graphical presentation application, or a file management application. It will be appreciated that other types of applications may be used. The target device 16 may connect through a network interface 19 to establish communication with the over the air communication network 14. It will be appreciated that multiple communication networks may be used to establish communication. For example, target device 16 may be connected to local routers and switches 19 which communicate to an internet server. The internet server may then couple to the over the air communication network 14 using an internet service provider or network interface. Although several cooperating networks may be used, mobile device 12 and target 16 are placed in communication.

Mobile device 12 has a user interface 26 for enabling a user to input control instructions for target 16. In this way, user interface 26 has been designed to implement the controllable features of application 28. For example, if application 28 is a media player, the user interface 26 may provide play, stop, pause, fast forward, rewind, and volume functions, which are typical control functions for media application 28. In another example, if application 28 is a presentation application, then user interface 26 may provide controls for advancing by one slide, going backward by one slide, viewing thumbnails of upcoming slides, allowing selections of individual slides, or enabling positioning of a marker or highlighter. In the specific example of a presentation application, itemized bullets on a slide may be introduced sequentially using the mobile controller. In order to more effectively control the remote presentation, the wireless mobile device receives information about the target presentation, and adapts its control features according to the current state of the presentation. It will be appreciated that each application 28 will have a particular user interface 26 with which it may be associated.

System 10 also has a trusted server 22 for assisting in properly associating mobile devices and targets. This association is accomplished in a trusted and secure environment, enabling targets to confidently allow mobile devices to assume control of selected aspects of applications. In order to facilitate this level of trusted communication, trusted server 22 has predefined information 11 as to mobile device information and target information. In one example, trusted server 22 maintains "handle" information for the mobile device. Often the handle identifier will the mobile identification number (MIN) information for each of its mobile devices. In some cases, the mobile devices may have communicate using a static TCP/IP connection, and therefore the IP address information may be used as the identifying handle. A public key is associated with the device address or MIN information, which is useful for enabling a public-key/private key encryption system. In a similar way, each target may have a handle, which is a simple or common name for referring to a target. Often, the handle is the email address for the target, or may be a username associated with a target's address on a network. In some cases, if the target uses a static IP address, the static IP address may also be used as the identifying handle. Target 16 may also have its public-key stored at the trusted server 22. With the basic mobile device and target device information stored on trusted server 22, mobile devices and targets may be associated for control applications.

In a typical application, target device 16 is operating and has a host application or other process available for enabling remote control and interaction. The remote control process is enabled to send selected control information to the mobile device, as well as receive and respond to control messages from the mobile device. The information sent from the target application to the remote device enables the remote device to adapt its interface to reflect the current state of the target application. In this way, the remote device enables intelligent control and operation of the remote target application. The target 16 connects through network interface 19 to an over the air communication network 14. Target device 16 may have predefined information on which particular mobile devices are allowed to control it, or mobile devices may make requests to control target 16. Either way, target device 16 and mobile device 12 cooperate to establish a secure and trusted communication link. In one example, target device 16 and mobile device 12 use an asymmetrical public-key/private key encryption mechanism to establish a trusted and authenticated communication link. Once a trusted relationship has been established, the target device and mobile device may move to a more efficient symmetrical security system. In such a symmetrical system, a time-limited session key is used by both the mobile device and the target device for encrypting and decrypting session communications.

With communication established, mobile device 12 either retrieves or receives a user interface specific to the application 28 to be controlled in the target. In one example, target 16 downloads the specific application user interface 26 to mobile device 12, and enables mobile device 12 to control target 16. In this case, the target device 16 may download a user interface specific to the level of control allowable for the particular mobile device. In this way, the target 16 may limit the access or control ability of mobile device 12 by downloading a restricted-use user interface. In another example, mobile device 12 may locally store a user interface, and upon determining the type of target application to be controlled, retrieve a particular user interface. In this example, the target device 16 may have an access control list which is downloaded to mobile device 12 which instructs the user interface 26 that only a certain level of functionality is available. In another example, user interface 26 is not limited, but target 19 and its application 28 restricts commands received from mobile device 12 to a set of approved commands. Using any one of these techniques, the ability of mobile device 12 to control target 16 may be limited, restricted, or controlled to desired levels.

Since user interface 26 is operated remotely, it is desirable that mobile device 12 be provided with sufficient information so that a user may be enabled to make control decisions in a timely and effective manner. In this way, current operational information regarding application 28 is communicated to mobile device 12 and made available through user interface 26. For example, if application 28 is a graphical presentation application, then current slide information, as well as available slide information is available for mobile device 12. In this way, a user at mobile device 12 may make timely decisions regarding future slides to be viewed at target 16. More specifically, selected information from application 28 is communicated to user interface 26 for facilitating remote user decisions. When using a graphical presentation application, it is often useful to allow the presenter to sequentially and individually present each bullet point on a slide. To do so remotely requires that the remote user have information regarding the present state of the presentation, that is, which slide and bullet is presently being shown to the audience. It would also be useful if the remote presenter had information regarding the presentation flow. For example, the presenter may desire to know what the next bullet point will be on the current slide, and may benefit from knowing the content of the next slide. With this information, the remote user could effectively control the presentation, confident that the presentation was properly synced with his or her desires. This intelligent remote control enables the wireless remote device to adapt to currently available options, and enables the user to make proper control decisions.

Mobile device 12 may, in one example, be a remote wireless handset. In another example, mobile device 12 may be a personal data assistant, a portable computing device, a wireless module installed in a larger device, or other remote wireless device. Typically, mobile device 12 will be a mobile wireless handset, due to the ubiquitous nature of wireless phones.

Figure 2:
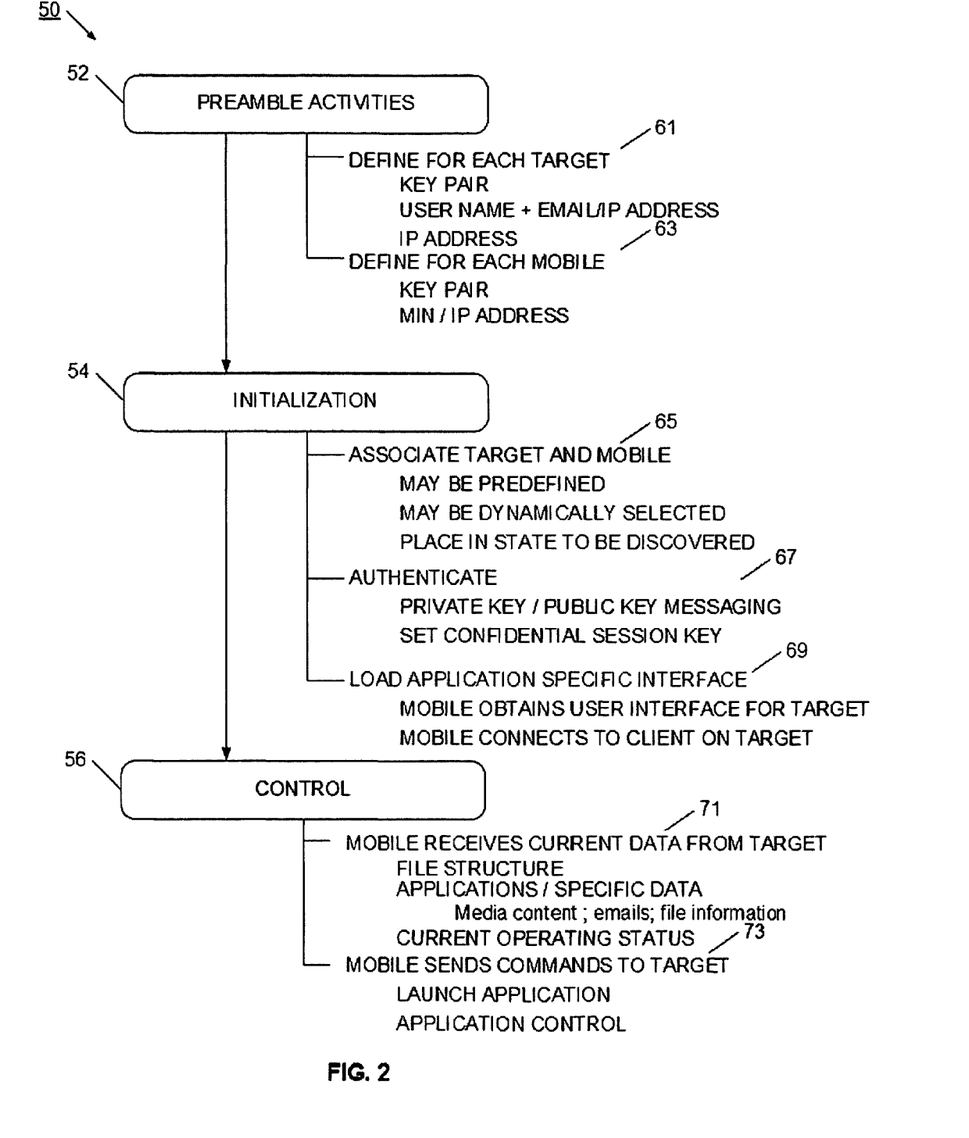
FIG. 2 is a flow diagram of a wireless control system in accordance with the present invention.

Referring now to FIG. 2, a system for managing an intelligent wireless control device is illustrated. Control method 50 has preamble activities 52 which are performed prior to a control session, initialization steps 54 which are performed to discover and authenticate target and mobile devices, and control processes 56 which are used to actively control a target from a mobile. Preamble activities 52 are used to register target and mobile devices with a trusted server so that future discovery and authentication processes may be done in a secure and trusted environment. As shown in block 61, a public-key/private key is established for each target. A public-key/private key pair is useful in establishing asymmetrical secured communication. A handle is also defined for each target, which enables simplified identification of a target. For example, the handle for a computer may be the name of the computer on its network, or may be the name of its primary user. In another example, a handle may be the e-mail address for the primary user of a computer, or may be another easy to remember name for the computer. In this way, the trusted server has handle and key information for each available target. Each mobile also registers with the trusted server as shown in block 63. Each mobile also has a public-key/private key pair, and registers its public-key with the trusted server. Mobile devices typically are identified with their mobile identification number (MIN), which is often referred to as their phone number. For data enabled devices, the mobile device may be identified by its TCP IP address. In this way, the public-key and address information for each mobile device is also preregistered with the trusted server.

During the initialization process 54, the preregistered targets and mobiles are associated for a particular control session. As shown in block 65, this association may be predefined, or may be dynamically set during initialization. In one example, a target has a particular set of mobile devices which are an authorized to control it, and upon initialization, attempt to establish a trusted communication with each of the authorized mobiles. In another example, the set of mobile control devices may not be preauthorized, but may be discovered upon initialization. In this way, mobile devices may be placed in a state to be discovered, and targets may be placed in a state to receive requests from mobile devices. In a typical example, a target is made operational and actively operates a particular target application. A mobile device makes a request to control the target's application. The target is in a state where it is able to receive the mobile's request, and then proceeds to further authenticate the mobile device. For example, the process may move to the authentication step as shown in block 67. The target and the mobile use asymmetric cryptography to authenticate each other. In the process a time-limited session key is also communicated from one of the target and the mobile to the other. After authentication, data in the session is encrypted using the session key. It will be appreciated that the asymmetrical private key/public-key messaging protocols consume valuable mobile processing power, and therefore a more efficient symmetrical security system may be desirable. In this way, after secure and trusted communication is established, the target and mobile communicate securely via symmetric encryption using a session key. The target and the mobile use asymmetric cryptography to authenticate each other. In the process a time-limited session key is also communicated from one of the target and the mobile to the other. After authentication, data in the session is encrypted using the session key.

The mobile now loads an application specific control interface as shown in block 69. This user interface is specific to the application operating on the target. For example, if the application is a media player, then the application specific interface may include play, pause, stop, fast-forward, rewind, and volume controls. This user interface may be stored at the mobile device and retrieved, or received in a message from target device. If the user interface is received from the target, then the target may adjust the capability of the user interface according to the desired level of access for that particular mobile. In this way, the access controls for the mobile device may be handled by limiting the utility of the user interface downloaded to the mobile device. In another example, the target may download an access control mechanism to the mobile, which cooperates with the user interface to limit the controls available to the user. In one specific example, if the local application is a media player, and the target does not desire the remote user to be able to adjust volume, then the volume control may not be downloaded to the mobile device. In another example, the access control list may define that the user interface is not allowed to control volume. Either way, the mobile device would be restricted from controlling the volume on the remote target.

For ongoing control 56, the mobile receives current data from a target process operating on the target as shown in block 71. The type of data or information received will depend on the specific application being operated on the target. The type of information will also depend on the access limits for the remote user, and the technical capabilities of the remote wireless device. For example, a fully authorized remote user having a wireless device with a full graphical display may receive substantial information regarding file structures, application status, available options, etc. However, if the user has more limited access rights, or has a more limited-capability wireless device, then less information may be sent. In a similar manner, the quality and speed of the communication link may dictate the level of information sent. Typically, the target is operating a host process that is configured to extract useful information regarding the operating application. Often, the operating application has an associated API (application programming interface) that allows the host process to interrogate the operating application, or to extract operational information. The host process may intelligently determine what information to extract, as well as which information to send to the remote device. To facilitate a positive user experience, the mobile device desirably controls the target in a manner consistent with local or tethered control. In this way, the remote user needs information sufficient to make proper decisions on target control. Accordingly, the mobile receives current information from the target regarding status of the application, as well as immediate control options. For example, the mobile device may receive information regarding current media content options, e-mail options, channel selection options, or file information options. In a more specific example, if the application is a graphical presentation application, then the mobile device may receive information regarding current, immediate past, and future slides that may be presented. The mobile may also receive a file structure that enables viewing of all slides available for selection. In this way, a remote user may make decisions consistent with decisions made at the local target. Using the local presentation of the user interface, which includes the target application information, the user sends commands to the host or target application as shown in block 73. This control may not only control the existing application, but may halt applications, start applications, or make file selections as shown in block 73.

As generally described above, the mobile device is used to control an application operating on the target, and to present sufficient information and choices to the user so that the target application may be effectively and efficiently controlled. In other uses, the mobile device may also be used to locally generate content, such as text, images, video, or audio, and send that content to the host application. In this way, the content creation process may be divided between the target and the mobile dependent on the particular application, and the specific features available on the mobile. For example, when the mobile is using an email host application, the user may create text content on the mobile device. In doing so, the user selects "Compose email" on mobile. Then using speech-to-text or an expanded mobile keyboard, the user inputs email text and addresses. Then using the user interface for the target file system, the user chooses attachment to attach to email, and sends the email content to the host target. The user then sends commands to the target so that the target sends the email.

Figure 3:
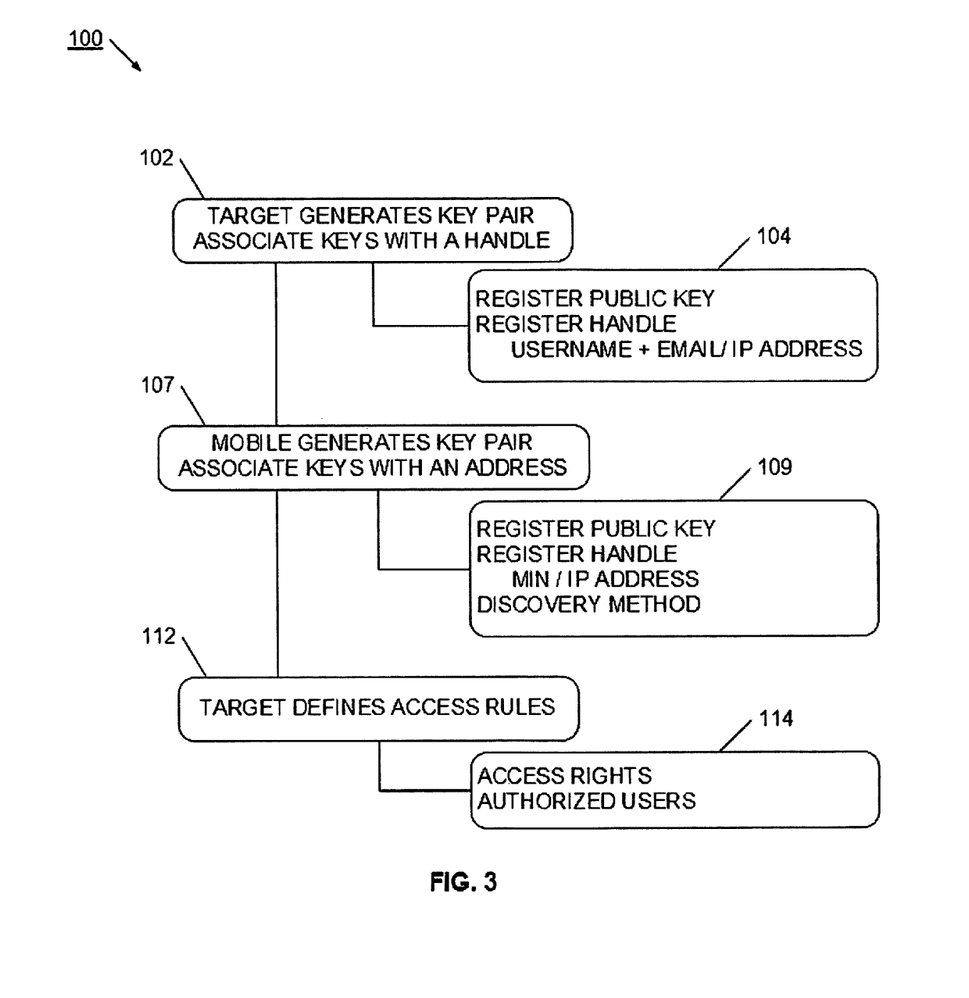
FIG. 3 is a flow diagram of initializing a wireless control system in accordance with the present invention.

Referring now to FIG. 3, a system for performing preamble activities for a wireless control device is illustrated. Method 100 has a target operating an application. In one example, the target is a computer system or another communication enabled processor system. The target has communication capability such that it may establish communication with a trusted server, such as a key server. The target generates a private key and public key pair The target also has a handle, which may be a name, e-mail address, or other easy identification value or indicator. The target registers its public key, handle, or name with the trusted key server as shown in block 104. In a similar manner, a mobile device generates a private and public key pair and registers its public-key, and handle with the trusted server. For a mobile, the handle typically will be its mobile identification number, although in other cases it may be its TCP/IP address. Also, the mobile may register its preferred discovery method with the trusted server. For example, some mobile devices may more efficiently respond to an SMS, MMS, or EMS message, while other mobile devices may respond more efficiently to TCP/IP communications.

More specifically, a mobile device may be configured to operate a small process which acts to determine when a target desires to establish a trusted communication. This small process may monitor for an SMS/MMS/EMS message, and more particularly may monitor for an SMS/MMS/EMS message with a particular code, value or message. In this way, a target, either alone or with in cooperation with a trusted server, may send a predefined SMS/MMS/EMS message to a mobile, and the mobile may therefore be aware that a target is trying to establish communication. In another example, a mobile may have TCP/IP enabled communication, and may therefore identify a particular port for receiving requests from targets. When a request is received on this specific port address, the mobile device becomes aware that the target desires to establish trusted communication. It will be appreciated that some mobile devices have both SMS/MMS/EMS and TCP/IP communication capability, and decision on which to enable may be made on application specific requirements. In another example, the mobile may register both types of discovery methods, and the target may attempt both methods in established communication.

During initialization, the target may also define particular access limits for a specific mobile, a set of mobiles, or all mobile devices. For example, if a target enables a mobile device to access its file structure, mobile devices may be restricted to particular files, or particular folder structures within the file system. In another example, the access rights may be established for each mobile individually, or may be established for sets of mobile devices. Also, it will be appreciated that the access rights are only the predefined access rights, and may be changed as specific communications are established between mobile and target devices. In one example, access control is applied to resources available at the target application. When the remote device requests to view, use, modify, delete, augment a target resource, the target consults an Access Control List (ACL) to determine the remote user's or device's rights. An example of a target resource is the list of files in a directory or folder. Another example is the list of bullets (i.e. the order and the text of each bullet) in a slide of a graphical presentation. Rights are determined by consulting the various ACLs. It will be appreciated that multiple levels of ACLs may be used. For example, the user may have a specific ACL, the type of device may have a specific ACL, and the type of communication link may have a specific ACL. In application, the most restrictive ACL "wins" and the mobile will be denied access according to the most limiting ACL.

Figure 4:
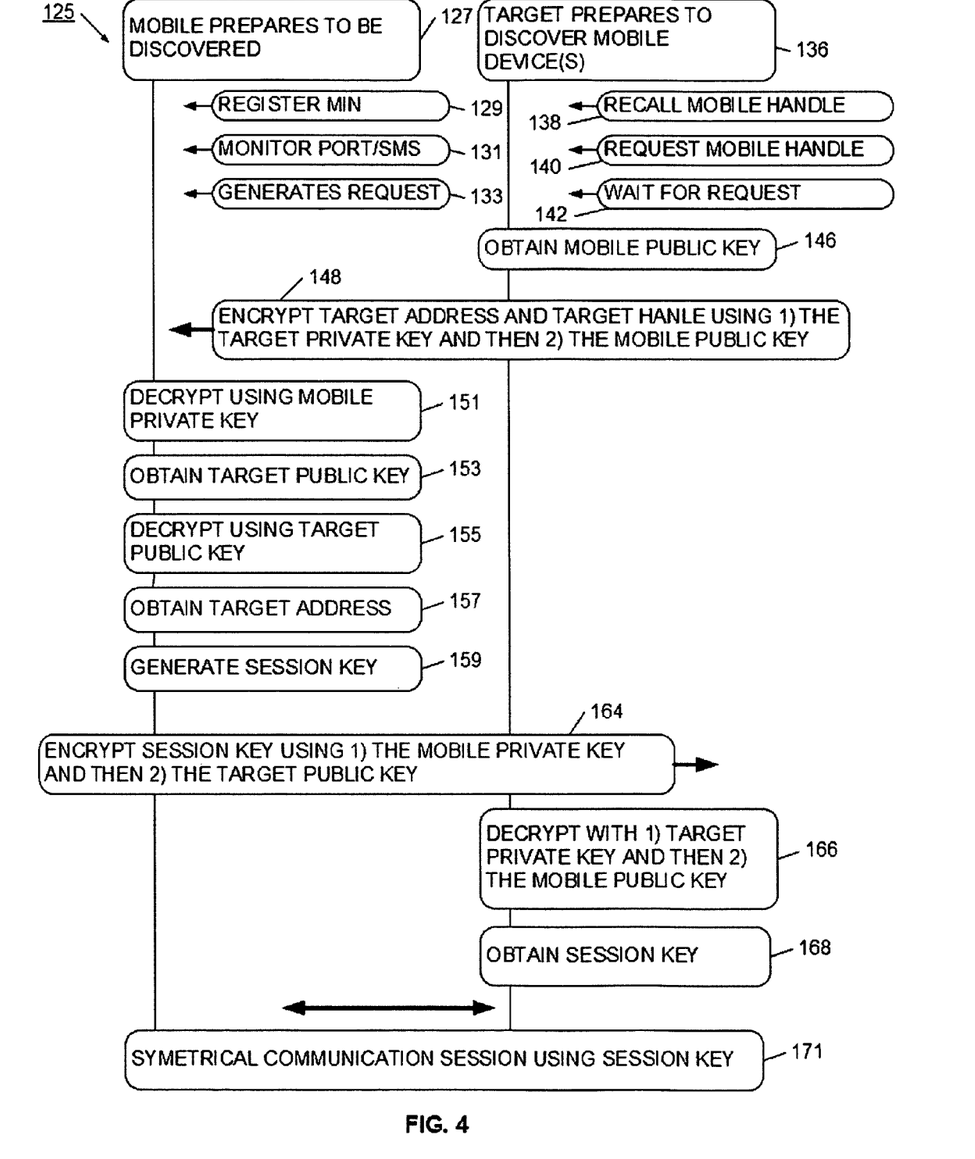
FIG. 4 is a flow diagram of a wireless control system in accordance with the present invention.

Referring now to FIG. 4, a method of using a wireless control device is illustrated. Method 125 has a mobile device that is prepared to be discovered as shown in block 127 In this way, the mobile device may have registered its mobile identification number and public key as shown in block 129. After registration, the mobile device monitors its SMS messages, or its TCP/IP ports, for contact by an appropriate target. If such a request is made, then the mobile starts a local client process and continues to establish trusted communication. In another example as shown in block 133, the mobile device may generate a request control specific target. For example, a user may walk into a room and be invited to control a target application. The mobile user may be invited to send a message to a target SMS mailbox or TCP/IP address, and thereby begin the establishment of trust communication.

The target is also prepared for discovery as shown in block 136. In one example, the target has a set of predefined mobile devices that are authorized to control it. In this way, the target may simply recall the mobile addresses as shown in block 138. In other cases, the target may receive requests for control, and thereby need to request a specific mobile handle (MIN or address) as shown in block 140. Finally, the target may have made itself available to receive requests, and thereby wait for requests from mobile devices as shown in block 142. Irrespective of which process is used to obtain the mobile address information, the target cooperates with the key server to obtain the mobile public-key. The mobile public-key, which has been prestored by the mobile device, is associated with the address for the mobile device. In this way, the target is able to retrieve the public-key for the mobile device. The target then encrypts the target IP address and the target handle using first the target private key and then the resulting message is encrypted to the mobile public-key. This twice encrypted message is then transmitted wirelessly to the mobile device. The mobile device, using its private key, decrypts the message. Upon decrypting with its private key, the mobile obtains the handle for the target. The mobile is then able to communicate with the trusted server to obtain the public-key for the target. Using the public-key of the target, the mobile further decrypts the message and obtains the target address as shown in block 157.

Upon confirming messages and addresses, the mobile confidently trusts the origination of the target message. Accordingly, the mobile generates a session key as shown in block 159. The session key is intended for symmetrical communication encryption, which is more efficient then asymmetrical encryption. The session key is encrypted by the mobile using its private key, and then encrypted to the target's public-key as shown in block 164. The twice encrypted session key is then wirelessly communicated to a target as shown in block 164. The target then decrypts the message using its private key and then the mobile public-key as shown in block 166. Provided the decryption process completes successfully, the target has authenticated the mobile as a trusted communication partner. It also has obtained the session key as shown in block 168. The target and mobile may then proceed with symmetrical communication encryption as shown in block 171. The process illustrated with FIG. 4 is used to establish a trusted communication between a target and a mobile. Further, the process described with reference to FIG. 4 also enables target devices and mobile devices to preregister with a trusted third party, and then upon application needs, establish control relationships between mobile devices and target devices.

Figure 5:
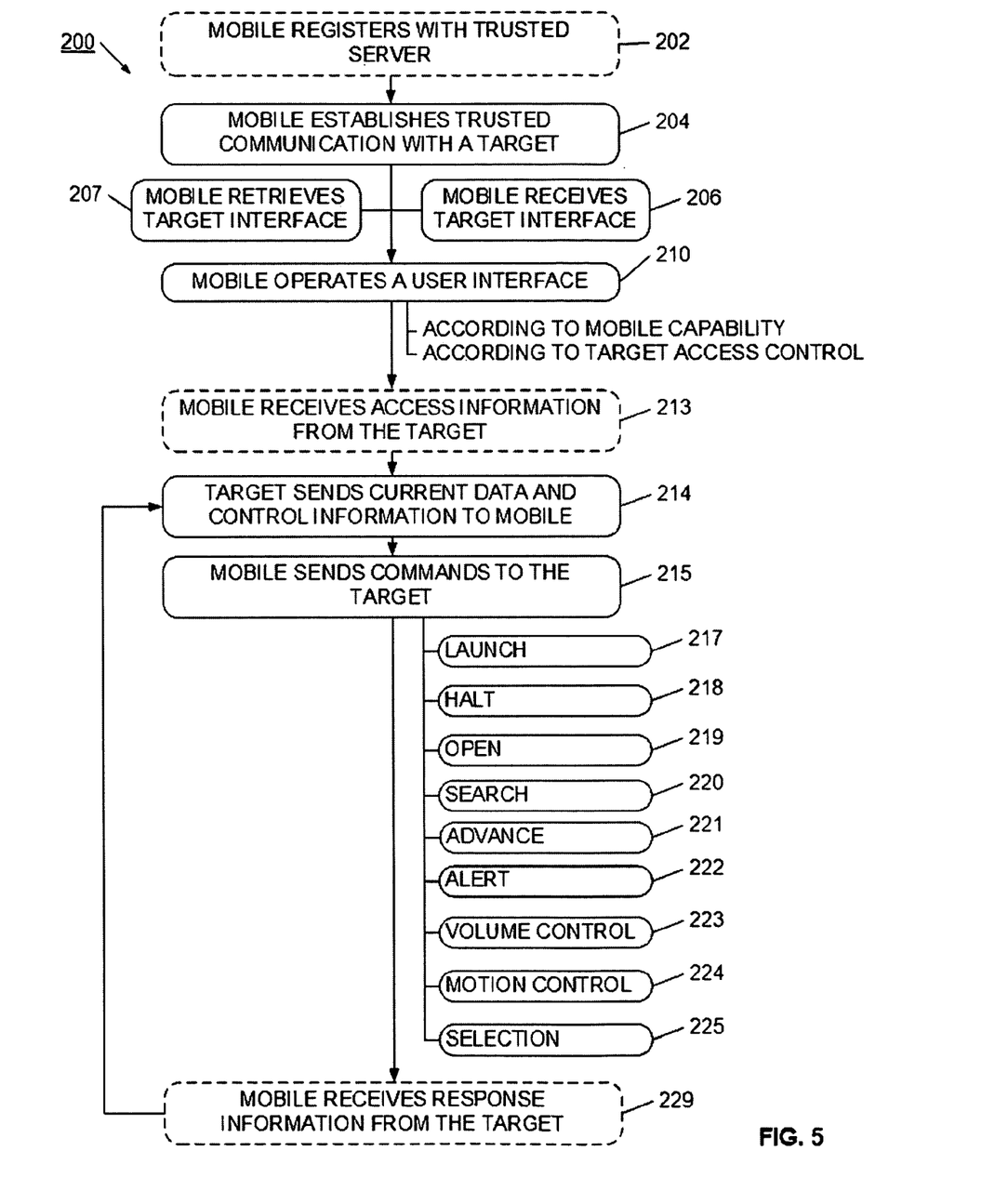
FIG. 5 is a flow diagram of a wireless control system in accordance with the present invention.

Referring now to FIG. 5, a method for controlling a target device is illustrated. Method 200 has a mobile registering with a trusted server as shown in block 202. As generally described with reference to FIG. 4, the mobile establishes trusted communication with the target as shown in block 204. Once trusted communication is established, the mobile may retrieve a target interface as shown in block 207, or may receive a target interface from the target as shown in block 206. Since the control interface is specific to the application operating on the target, the mobile needs application information in order to retrieve the target interface as shown in block 207. For example, if the target is operating a media player, then the mobile uses this information to retrieve a player user interface from its local memory. Of course, the specific capability available to the local player the may be adjusted according to the specific player activated at the target, or according to an access control list. It will be appreciated that other methods of limiting the ability of the user interface may be used. In another example, the target may detect or otherwise determine the type of mobile device used, and download a specific user interface to the target. For example, the target may determine the user has a specific wireless handset having a particular resolution for its graphical display. The target may also identify the user as having a particular access limit, and thereby download a user interface particular to the mobile device and according to the level of access allowed for that user. Once the mobile device has received the user interface, the user interface is activated on the mobile device as shown in block 210. The user interface operates according to the specific mobile capability, and according to any target access controls that may be set. The mobile may also receive more specific control access information as shown in block 213. This control access information may be in the form of limitations in the remote control user interface, or in the types of information or options made available to the remote user. It will be appreciated that that access control information may be provided in alternative forms.

In using the control interface, the control interface desirably has information regarding the current status and available options at the target application. Since the mobile device may be operated from a remote location, and communicates through public communication networks, this information is important to provide an effective, robust, and user-friendly experience for the remote user. In this way, the mobile device and control interface receives application information from the target application as shown in block 213. This information may include for example, information regarding current status, available options, and actions taken at the target.

With trusted and controlled communication established, the mobile is now able to use the application control interface to send commands to the target as shown in block 215. These commands may be for example, a command to launch a new application as shown in block 217, a command to halt operation as shown in 218, or other program operation. The commands may also include file commands such as open the file 219, search for filed or phrase as shown in block 220, or other file or folder operation. The commands may also include commands such as playing, fast forward, rewind, play, pause, advance 221 or other commands associated with media controls. The commands may also include commands for setting or disabling alerts as shown in block 222, or may include volume controls 223 or motion controls 224. The controls may also include broad selection capabilities 225 or the ability to activate processes within target applications. For example, the mobile device may be used to send an e-mail from a target computer system. In a case where the remote device has substantial keyboard or voice-to-text capability and a relatively large display, the remote device may include a robust set of email drafting and editing controls. In the case of a graphical presentation, the remote wireless control may include: advance or reverse one or more slides, or pick a slide form thumbnail list. The remote may allow introduction or bypassing of bullets from individual slides. The remote may also present speaker comments or notes to assist the remote user in making the presentation. In the case of controlling an IPTV device, the wireless remote may have controls for: play, pause, stop, select channel, advance, or rewind buffered channel. The wireless remote may also allow channel select from graphical or textual channel listing. In more sophisticated wireless remotes, the wireless remote may even support a picture-in-a-picture feature to preview content before making the selection active on the target.

Once the mobile has initiated a command as shown in block 215, the mobile device generates a command message and forwards the command message through a public communication network to the target application. The target is operating a host process which receives the message and parses it to extract the specific command. The local application has an API (application programming interface) which allows an API command. The local process converts the command received from the mobile into an API command or data, and sends the appropriate command or data to the application. The application then executes the command as received from the mobile device. In another example, the mobile device may make information or status requests for the target application. Since the mobile device may be remotely positioned, it may need periodic status updates to properly inform the mobile user of current control options. In another example, the target application may send update information as target control options change. In some cases, it may be possible that the mobile device and the target application to become unsynchronized. This may occur, for example if a local or tethered control is also operating the target application. In this case, synchronization could be affected. Synchronization may be lost for other reasons, for example, if another local or remote user changes a file location or deletes a file. However, the target is aware that a remote mobile is authorized to operating it, and thus whenever such changes occur, the target may easily send the new state or an update to the mobile. In some cases, the update would immediately be communicated to the remote user, and in other cases, the change would affect future choices the remote user could make.

In a particular example as shown in block 229, after the target performs the command in block 215, the target then responds to the mobile by sending a confirmation that the command has been performed, or sends updated information regarding the status of the target application. Either way, the mobile device becomes aware of the control status of the target application. In this way, the user at the mobile device may make more accurate and effective decisions on future control of the target application.

Figure 6:
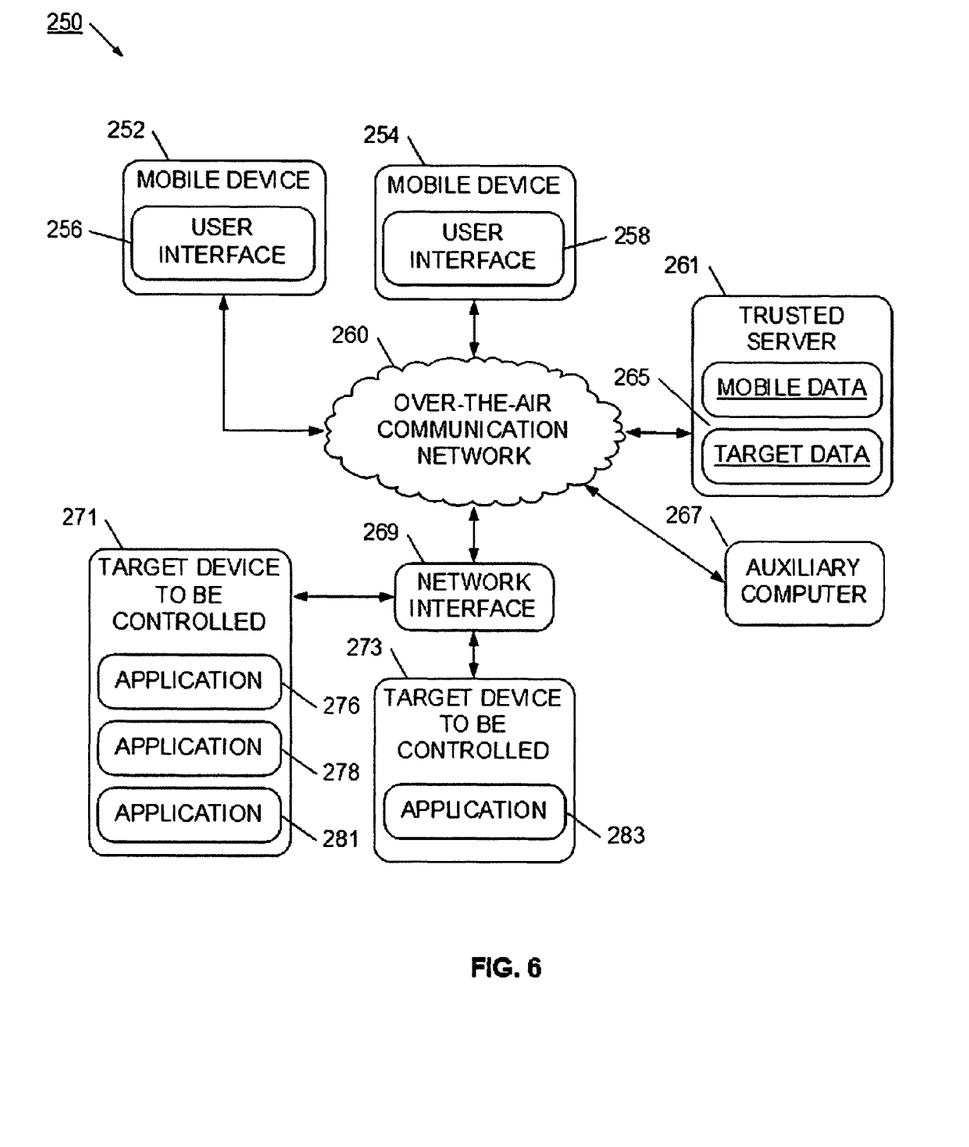
FIG. 6 is a block diagram of a wireless control system in accordance with the present invention.

Referring now to FIG. 6, and a system for wireless control is illustrated. System 250 has multiple mobile devices, such as mobile devices 252 and 254 for communicating through an over the air communication network 260. As previously described, mobile devices 252 and 254 may have registered with a trusted server 261 thereby having their mobile data 265 stored on the trusted server. In a similar manner, multiple targets such as target 271 and target 273 may also communicate through a network interface 269 to the over the air communication network 260. The targets may also have their information stored on the trusted server as shown in block 265. Each target may be running one or more applications. For example, target 273 is shown to be operating application 283. In other example, target 271 is shown to be operating applications 276, 278, and 281. Accordingly, mobile device to 252 may be set to establish control for one of the targets, such as target 271, and mobile device 254 made may be established to have control of target device 273. In another example, both mobile devices may be used to control applications on target 271, or both mobile devices may be used to control application 283. It will be appreciated that many alternatives exist for the relationship between the mobile devices and the applications.

An auxiliary computer 267 may also be used to facilitate setting up and using the wireless control system. The auxiliary computer 267 may be used, for example, to define intended control relationships. In this way, a user may use auxiliary computer 267 to define which mobile devices, such as mobile device 252 and 254 should be associated with particular applications operating on specific targets. It will be appreciated that the auxiliary computer 267 may communicate through various network connections, and may be implemented through one or more network systems.

Figure 7:
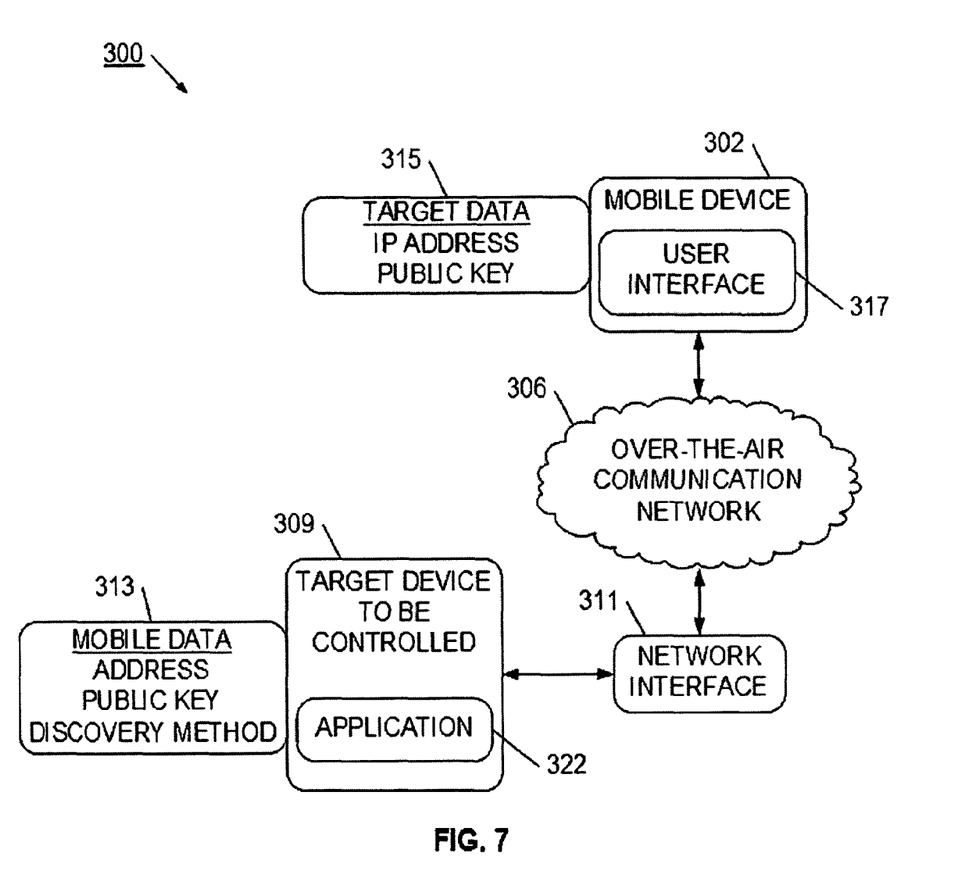
FIG. 7 is a block diagram of a wireless control system in accordance with the present invention.

Referring now to FIG. 7, another wireless control system is illustrated. Wireless control system 300 is similar to wireless and control system previously described, so will not be discussed in detail. Wireless control system 300 does not have a trusted third party key server, but relies upon predefined relationships to establish trusted communications. For example, mobile device 302 has target data 315 which defines an IP address and a public key for communication with a particular target. In a similar manner, target 309 has mobile data information 313 which defines particular mobile address and public key information for establishing secured and trusted communication with mobile device 302. The mobile and the target may share their respective public keys, for example, by exchange over a secure network, or by preloading the keys by exchanging magnetic media. The mobile data 313 also includes discovery method information so that target 309 can initiate the client process on mobile device 302. Since the mobile device and target device 309 all have a predefined security and discovery information, no third-party discovery server is required. In this way, user device 317 may effectively, securely and efficiently link control application 322. Of course, target 309 may communicate to the over the air communication networks through a network interface 311. As with previous networks, the over the air communication network 306 may be a CDMA, CDMA2000, UMTS, GMS, edge, GPRS, PHS, or PCS standard telecommunications system. Of course, it will be appreciated that other over the air wireless communication standards may be used.

Figure 8:
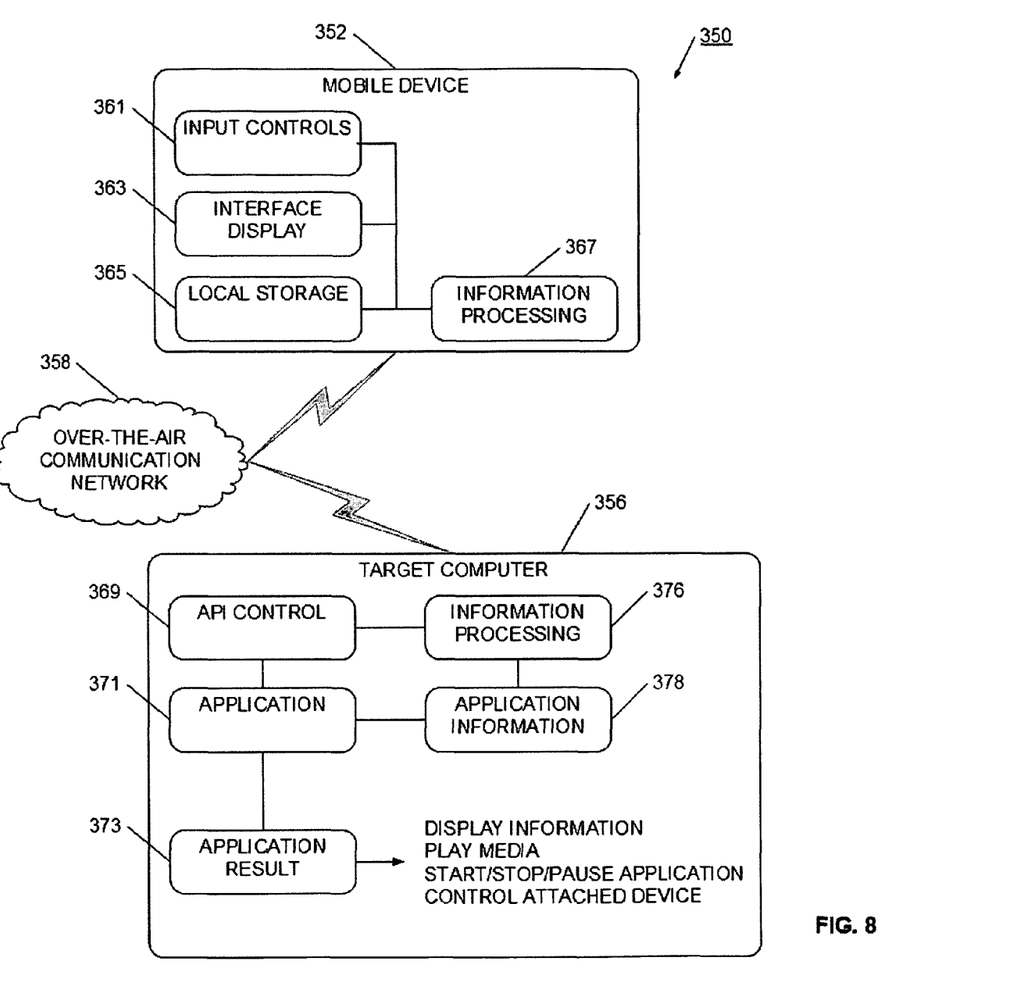
FIG. 8 is a block diagram of a wireless control system in accordance with the present invention.

Referring now to FIG. 8, a wireless control system is illustrated. Wireless control system 350 has a mobile device 352 communicating through an over the air communication network 358 to a target computer system 356. The mobile device has an information processing application 367 which is used for receiving and transmitting information to the over the air communication network 358. In a similar manner, the target computer 356 has an information processing application 376 for sending and receiving information on the over the air communication network 358.

The mobile device 352 operates a control interface that has an interface display 363 for informing a mobile user of available control options. In particular, this interface display displays information according to available control available at the target application, as well as limitations according to access control limits. Input controls 361 are also present of the mobile device for enabling target control. For example, the mobile device may have a set of soft keys, or may define particular keys to implement specific functions for the target application. It will be appreciated that many options exist for defining keys, knobs, controls and other imports on the mobile device. The mobile device 352 also has local storage 365 for storing control information and user interface information.

Target computer 356 has an application 371 which operates to provide a local target function. For example, the application 371 may be a media player, graphical presentation, e-mail process, or other local operating application. The application has an API control input 369 which is enabled to receive commands from information processing application 376. In this way, messages received from the information processing module 376 may be used to effect control in application 371. More particularly, when an input control 361 is selected, the mobile device 352 generates a control message using the information processing module 367. The control message is transmitted through the over the air communication network to the target computer 356 and received by the information processing module 376. The information processing module 376 extracts the API command information and transfers it to the application 371. In this way, the application 371 performs the control selected by mobile device 352. The application 371 associates with the application information module 378 for maintaining status information regarding the application. The application information may be communicated to the mobile device 352 for allowing the mobile user to make more effective control decisions. For example, application information 378 may be processed through information processing module 376 for communication to information processing module 367 on the mobile device. The application's status information may thereby be displayed on the interface display 363, and also may affect which input controls are available for use, or their particular function as shown in block 361.

Referring again to the target computer 356, when the API command is received at the application 371, the application proceeds to perform a particular control function. That control function may be, for example, to display particular information, to play media in a defined way, to start, to stop, or pause an application, or it may be to control an attached device. It will be appreciated that many other application results may be used.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

The invention claimed is:

1. A method for controlling a target device comprising:
   monitoring for a trust initialization message at a first mobile device, wherein the trust initialization is transmitted from the target device;
   receiving at the first mobile device the trust initialization message;
   establishing a trusted communication link between the target and the first mobile device based on authenticating a unique code presented by the first mobile device;
   operating a target control interface on the first mobile device, wherein the target control interface is adjusted based on at least two factors selected from the group consisting of: the first mobile device capability, the quality of the link, the speed of the link, a first mobile predetermined access level, and the presence of another mobile device operating the target;
   presenting target control information at the first mobile device;
   receiving at the first mobile device a control instruction responsive to presenting the target control information;
   generating a control message at the first mobile device according to the control instruction; and
   transmitting wirelessly the control message from the first mobile device to an address for the target device.

2. The method according to claim 1, wherein the presenting step further comprises the steps of:
   receiving target application status information; and
   synchronizing the target control interface using the target application status information.

3. The method according to claim 2, wherein the target application status information is selected from the group consisting of: target device file information; target device media information; current display status of the target device; and current control options available at the target device.

4. The method according to claim 1, further comprising the steps of:
   receiving target application status information responsive to transmitting the control message; and
   synchronizing the target control interface using the target application status information.

5. The method according to claim 1, further comprising the step of receiving the target control interface in a wireless communication.

6. The method according to claim 1, wherein the trust initialization message is an SMS, MMS, or EMS message or a message at a predefined IP port.

7. The method according to claim 1, wherein the first mobile device is a mobile wireless handset operating according to a commercial, military, or governmental air interface.

8. The method according to claim 1, wherein the first mobile device is a mobile wireless handset operating according to CDMA, OFDMA, CDMA2000, UMTS, GSM GPRS, EDGE, PHS, or PCS.

9. The method according to claim 1 wherein the unique code is selected from a group consisting of the MIN of the first mobile device, the IP address of the first mobile device, a user specified code, and combinations thereof.

10. The method according to claim 1 further comprising the steps of:
    monitoring for the trust initialization message at a second mobile device;
    receiving at the second mobile device the trust initialization message;
    establishing a second trusted communication link between the target device and the second mobile device based on authenticating a second unique code presented by the second mobile device;
    operating a second target control interface on the second mobile device, wherein the second target control interface is adjusted based on at least two factors selected from the group consisting of the second mobile device capability, the quality of the second link, the speed of the second link, a second predetermined access level, and the presence of another mobile device operating the target device;
    presenting target control information at the second mobile device, wherein the target control information is based on the control message from the first mobile device;
    receiving from the second mobile device a control instruction responsive to presenting the target control information;
    generating a control message at the second mobile device according to the control instruction; and
    transmitting wirelessly from the second mobile device the control message to an address for the target device.

11. The method according to claim 10 wherein the first predetermined access level provides different access rights than the second predetermined access level.

* * * * *